United States Patent
Gotoh et al.

[11] Patent Number: 6,156,427
[45] Date of Patent: Dec. 5, 2000

[54] ELECTROCONDUCTIVE RESIN COMPOSITION FOR MOLDING AND ELECTROMAGNETIC WAVE INTERFERENCE SHIELD STRUCTURE MOLDED FROM THE COMPOSITION

[75] Inventors: Masao Gotoh, Yokosuka; Makoto Iida, Kawasaki; Kenichi Waragai, Fujisawa; Meiichi Ohta; Susumu Iwai, both of Hadano, all of Japan

[73] Assignee: Hitachi, Ltd., Tokyo, Japan

[21] Appl. No.: 07/769,348

[22] Filed: Oct. 2, 1991

Related U.S. Application Data

[63] Continuation of application No. 07/219,267, Jul. 15, 1988, abandoned.

[30] Foreign Application Priority Data

| Jul. 20, 1987 | [JP] | Japan | 62-179000 |
| Dec. 4, 1987 | [JP] | Japan | 62-305608 |

[51] Int. Cl.[7] .................. B32B 1/04; H01B 1/06
[52] U.S. Cl. ............ 428/378; 252/508; 252/509; 252/511; 252/513; 428/388; 428/397; 428/407
[58] Field of Search ................ 428/375, 378, 428/388, 397, 403, 407; 252/508, 509, 511, 513

[56] References Cited

U.S. PATENT DOCUMENTS

| 2,877,501 | 3/1959 | Bradt | 264/143 |
| 4,169,186 | 9/1979 | Tazaki et al. | 428/406 |
| 4,388,422 | 6/1983 | Gerteisen et al. | 523/137 |
| 4,530,779 | 7/1985 | Mayama et al. | 252/507 |
| 4,566,990 | 1/1986 | Liu et al. | 252/503 |
| 4,596,670 | 6/1986 | Liu | 252/511 |
| 4,610,808 | 9/1986 | Kleiner | 252/513 |
| 4,788,104 | 11/1988 | Adriaensen et al. | 428/288 |
| 4,816,184 | 3/1989 | Fukuda et al. | 252/511 |
| 4,818,615 | 4/1989 | Luxon et al. | 428/407 |

FOREIGN PATENT DOCUMENTS

| 58-73198 | 10/1981 | Japan . |
| 58-150203 | 9/1983 | Japan . |
| 61155457 | 7/1986 | Japan | 523/137 |
| 6386755 | 9/1986 | Japan | 523/137 |
| 63-250198 | 12/1988 | Japan . |
| 2123838 | 2/1984 | United Kingdom . |
| 8401783 | 5/1984 | United Kingdom | 523/137 |

OTHER PUBLICATIONS

Patent abstracts of Japan, unexamined applications, vol. 10, No. 199, Jul. 11, 1986 Abstracts only.
The Patent Office Japanese Government p. 144 C 359.
The Patent Office Japanese Government p. 123 C 437.
Patent Abstracts of Japan, unexamined applications, vol. 11, No. 232, Jul. 29, 1987 Abstracts only.

*Primary Examiner*—Blaine Copenheaver
*Attorney, Agent, or Firm*—Antonelli, Terry, Stout & Kraus, LLP

[57] ABSTRACT

An electromagnetic wave interference shield structure molded from an electroconductive resin composition for molding, which comprises columnar pellets of a specific length, made of a bundle of iron-based metal fibers as an essential component and at least one bundle of at least another kind of electroconductive fibers of different material in a different diameter than that of the iron-based metal fibers as independent electroconductive fiber-cores, coated with a thermoplastic resin having a specific range of heat distortion temperature continuously in the longitudinal direction has a stable and distinguished shield effect for a prolonged time.

16 Claims, 8 Drawing Sheets

ELECTROCONDUCTIVE RESIN COMPOSITION FOR MOLDING AND ELECTROMAGNETIC WAVE INTERFERENCE SHIELD STRUCTURE MOLDED FROM THE COMPOSITION

This application is a Continuation of application Ser. No. 07/219,267, filed Jul. 15, 1988 now abandoned.

BACKGROUND OF THE INVENTION

This invention relates to an electroconductive resin composition for molding, which comprises columnar pellets of a specific length, made of a bundle of iron-based metal fibers as an essential component and at least one bundle of at least another kind of electroconductive fibers of different material in a different diameter than that of the iron-based metal fibers as independent electroconductive fiber cores, coated with a thermoplastic resin having a specific range of heat distortion temperature, preferably a filler-containing thermoplastic resin, continuously in the longitudinal direction, and to an electromagnetic wave interference shield structure molded from the composition.

With more advanced functions and higher performance for electronic equipment such as computer terminals, etc., there have been such problems that the electromagnetic waves generated by LSI operation control interfere with neighboring electronic equipment to induce maloperations, and regulations to control the interference of electromagnetic waves have been enforced in the USA and West Germany and voluntary control regulation has been enforced in Japan on Mar. 27, 1986, by Voluntary Control Council For Interference by Data Processing Equipments and Electronic Office Machines (VCCI).

Heretofore, various means have been used to give an electromagnetic wave interference shield function to plastic moldings. It is known to provide a metallic film on the inside walls of plastic molding by plating or melt injection, or to provide an electroconductive film on the walls of plastic moldings by electroconductive coating, or to mold a resin containing metal fibers or flaky electroconductive materials into an electromagnetic wave interference shield structure [Japanese Patent Applications Kokai (Laid-open) Nos. 59-22710, 59-49918 and 62-45659 and Japanese Patent Publication No. 62-36069].

That is, the prior art can be classified into two major groups, i.e., provision of an electroconductive film on a plastic molded housing on one hand and molding of a resin containing electroconductive materials into a housing on the other hand.

The first group i.e., providing an electroconductive film on a plastic molded housing has such problems as a large number of processing steps and operators, much cost and labor for working atmosphere and surroundings and less reliability in the durability of adhesion and electroconductivity of the deposited film, that is, the durability of shield effect.

The second group i.e., molding a resin containing electroconductive materials into a housing has such problems as lowering of electroconductivity. For example, the electroconductivity is deteriorated with increasing thermal shock cycles in a thermal shock cycle test which evaluates the durability. That is, the shield effect is decreased. Another serious problem is the breakage of electroconductive fibers due to shearing forces applied during kneading of a resin and electroconductive fibers to prepare pellets for molding and the resulting lowering of the shield effect in proportion to the degree of the breakage. Thus, it is necessary to increase the amount of the electroconductive fibers in the resin in anticipation of the breakage of the electroconductive fibers, but this will bring about such secondary problems as lowering of the productivity and an increase in the weight of moldings.

SUMMARY OF THE INVENTION

An object of the present invention is to provide a novel electroconductive resin composition for molding, which can give a stable electromagnetic wave interference shield effect for a prolonged time together with higher productivity and economy and also to provide an electromagnetic wave interference shield structure molded from the composition, while overcoming the problems of the prior art.

The present invention provides an electroconductive resin composition for molding, which comprises columnar pellets of a specific length made of a bundle of iron-based metal fibers as an essential component and at least one bundle of at least another kind of electroconductive fibers of different material in a different diameter than that of the iron-based metal fibers as independent electroconductive fiber-cores, coated with a thermoplastic resin having a specific range of heat distortion temperature continuously in the longitudinal direction.

Furthermore, the present invention provides an electroconductive resin composition for molding, which comprises single-core, columnar pellets of a specific length, each made of a bundle of iron-based metal fibers as an electroconductive core, coated with a thermoplastic resin having a specific range of heat distortion temperature continuously in the longitudinal direction and at least another kind of single-core, columnar pellets, each made of a bundle of another kind of electroconductive fibers of different material in a different diameter than that of the iron-based metal fibers as an electroconductive core, coated with the thermoplastic resin continuously in the longitudinal direction.

Still further, the present invention provides an electroconductive resin composition for molding, which comprises multi-core, columnar pellets, each made of a bundle of iron-based metal fibers as an essential component and at least one bundle of at least another kind of electroconductive fibers of different material in a different diameter than that of the iron-based metal fibers as independent electroconductive fiber cores, coated together with a thermoplastic resin having a specific range of heat distortion temperature continuously in the longitudinal direction.

Still furthermore, the present invention provides electromagnetic wave interference shield structures molded from these electroconductive resin compositions for molding, for example, electronic equipment housings, electronic part containers for electrostatic charging shield, walls for electromagnetic wave interference shield, and protective plates for electronic black boards and display boards.

In the present invention, structures having a distinguished electromagnetic wave interference shield function can be molded from these electroconductive resin compositions by injection molding, transfer molding, compression molding, vacuum-pressure forming molding, etc. with high levels of productivity, economy and reliability.

In the present invention, iron-based metal fibers having a high aspect ratio (ratio of length to diameter), that is, 400 to 2,000, for example, stainless steel fibers, are used as an essential component to increase the contact effect per fiber content, and at least another kind of electroconductive fibers of different material in a different diameter with a good heat radiation and a good economy than that of the iron-based metal fibers, including metal-plated fibers, are used together to attain not only a high electromagnetic wave interference shield effect but also high productivity and economy.

The present electroconductive resin for molding is characterized by the composition and structure of pellets containing the electroconductive fibers as the components.

Very fine electroconductive metal fibers prepared by drawing are liable to break during ordinary kneading, and the breakage of fibers is connected to the lowering of the shield effect. In order to prevent the breakage, a bundle of the fibers is coated with a thermoplastic resin, preferably a filler-containing thermoplastic resin continuously in the longitudinal direction. The present electroconductive resin composition comprising pellets made of a bundle of the electroconductive fibers coated with the thermoplastic resin, preferably filler-containing thermoplastic resin, is very readily moldable as a molding material, because the pellets have an appropriate specific range of length for ensuring the moldability on such a level as not to deteriorate the contact effect.

The present structures molded from these electroconductive resin composition are used as electromagnetic wave interference shield structures. Since a thermoplastic resin having a specific range of heat distortion temperature is used in the present invention, the shield effect can be maintained for a prolonged time, and thus the present structures can withstand changes in the temperature of service atmosphere or vibration loads during the transportation and thus can withstand any deterioration of the shield effect and mechanical strength. That is, the thermal stress relaxation can be reduced and the mechanical strength can be maintained on a high level in the present invention because a thermoplastic resin having a specific range of high heat distortion temperatures is used. Furthermore, the heat radiation and dimensional stability of the molding can be maintained on a high level and the difference in the coefficient of thermal expansion between the electroconductive fibers and the resin can be made smaller to prevent displacement of contact points of electroconductive fibers in the present invention by adding a filler to the thermoplastic resin.

In order to overcome the problem of breakage of electroconductive fibers during kneading, bundles of the electroconductive fibers including a bundle of iron-based metal fibers as an essential component are coated with a thermoplastic resin having a specific range of heat distortion temperature and cut to pellets of specific length, and structures molded from these pellets can have a distinguished electromagnetic wave interference shield effect for a prolonged time, and also can have an improved heat radiation effect and an improved dimensional stability by further adding a filler to the thermoplastic resin.

In the present invention, a bundle of very fine iron-based metal fibers, for example, stainless steel fibers, is used as an essential component, whereby many more contact points can be formed in the molded structure and the electroconductivity of the molded structure can be much improved by simultaneous use of at least another kind of electroconductive fibers of different material in a different diameter than that of the iron-based metal fibers. Particularly when a bundle of copper-based fibers is used together with a bundle of the iron-based metal fibers, the electroconductivity of the molded structure can be improved with a smaller content of the electroconductive fibers by virtue of the excellent electroconductivity of copper. In addition the lowering of moldability of the resin composition can be prevented due to the smaller content of the electroconductive fibers and the specific gravity of the molded structure can be so lowered that the final product housing can have a lighter weight. When a bundle of metal-coated carbon fibers of smaller specific gravity by themselves is used together with a bundle of the iron-based metal fibers, distinguished effects can be obtained with the molding of lighter structures.

In the present invention, a thermoplastic resin having a specific range of high heat distortion temperatures, that is, a less thermal stress relaxation, is used, and thus changes in the electroconductivity of the molded structure in the thermal shock cycle test can be suppressed and the electromagnetic wave interference shield effect of the final product housing can be maintained for a prolonged time. The filler, when added to the thermoplastic resin, can improve the heat radiation and dimensional stability of the molded structure and consequently can improve the operating stability and reliability of electronic equipment housed in the molded structure.

The present electroconductive resin composition for molding and electromagnetic wave interference shield structures molded from the composition will be described in detail below, referring to the accompanying drawings.

DETAILED DESCRIPTION OF THE INVENTION

Figure 1:
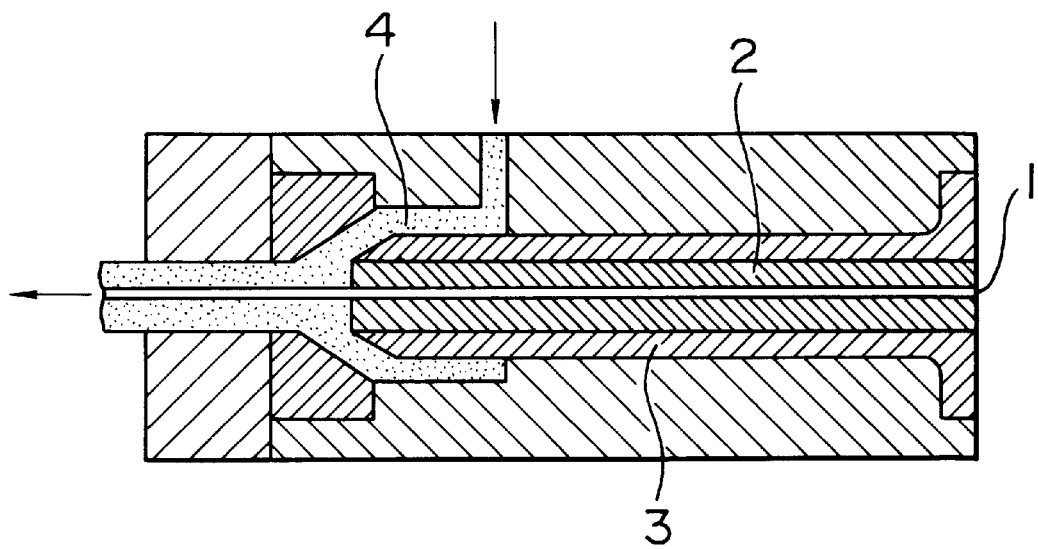
FIG. 1 is a cross-sectional view of a cross-head for extruding a single-core filament for preparing pellets according to the present invention.

Metal fibers and metal-coated fibers are used in the present invention as electroconductive fibers. That is, iron-based metal fibers having a diameter of 5 to 15 $\mu$m, such as stainless steel fibers, are used as an essential component, and also at least one of copper-based metal fibers having a diameter of 15 to 60 μm, such as brass and nickel silver fibers, aluminum-based metal fibers having a diameter of 15 to 60 μm such as aluminum A5052 and A7075 fibers, and metal-coated fibers having a diameter of 15 to 60 μm such as nickel-plated carbon fibers, nickel-copper-plated glass fibers and nickel-copper-plated polymer fibers, is used as other electroconductive fibers of different material in a different diameter than that of the iron-based metal fibers.

When the electroconductive fibers are used in single-core pellets, a bundle of iron-based metal fibers having an aspect ratio (length/diameter) of 400 to 2,000 and a diameter of 5 to 15 μm such as stainless steel fibers is coated with a thermoplastic resin having a specific range of heat distortion temperature and cut to a length of 6 to 10 mm in the pellet form, and at least one of copper-based metal fibers, aluminum-based metal fibers and metal-coated fibers having an aspect ratio of 50 to 600 and a diameter of 15 to 60 μm is coated with the thermoplastic resin and cut to a length of 3 to 9 mm in the pellet form.

When the electroconductive fibers are used in multi-core pellets, at least one bundle of the iron-based metal fibers as an essential component and at least one bundle of other electroconductive fibers than the iron-based metal fibers are coated together with the thermoplastic resin and cut to a length of 3 to 10 mm in the pellet form.

A thermoplastic resin for use in the present invention must have a heat distortion temperature of 80° to 210° C., because the electroconductive fibers themselves must be three-dimensionally entangled to give contact points to form an electroconductive circuit of so-called reticular structure and the contact pressure on the contact points must be kept on some level to attain the electromagnetic wave interference shield effect of the final molded product, i.e., a housing for electronic equipment, for a prolonged time, and to this effect a thermoplastic resin having a low reduction in the thermal stress relaxation must be used. The higher the heat distortion temperature of thermoplastic resin, the more desirable, but above 210° C. the moldability will be deteriorated. Thus, 210° C. is an upper limit to the heat distortion temperature. The range of heat distortion temperature is preferably 100° to 150° C., more preferably 110° to 130° C., in the present invention.

One of polyphenyleneether, polyethersulfone, polybutylene terephthalate, ABS resin, high impact polystyrene, polycarbonate, nylon, polypropylene, and such polymer alloys as polyphenyleneether/polycarbonate, polybutylene terephthalate/polycarbonate, ABS resin/polycarbonate and high impact polystyrene/polycarbonate is used in the present invention as the thermoplastic resin upon selection in accordance with a mechanical strength level required for the final molded product.

At least one of quartz powder having an average particle size of 20 to 30 μm, metal flakes having a square of 1 to 2 mm×1 to 2 mm and a thickness of 10 to 30 μm such as Mg, Al and Ti flakes, plated mica having a square of 1 to 2 mm×1 to 2 mm and a thickness of 10 to 30 mm can be added to the thermoplastic resin as the filler for improving the heat radiation and dimensional stability of the moldings. The filler can be added in an amount of 5 to 10% by weight on the basis of the thermoplastic resin.

Furthermore, the thermoplastic resin can contain 0.5 to 5% by weight in total of such additives as a pigment, a flame retarder, an internal release agent, an antioxidant, etc.

Figure 2:
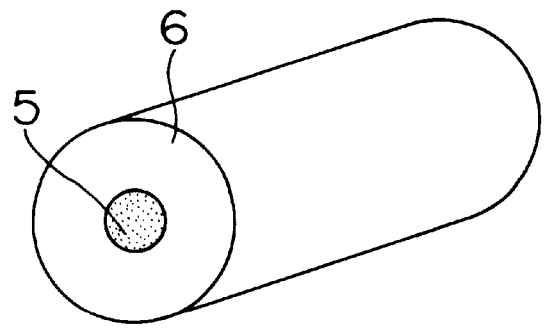
FIG. 2 is a perspective view of a single-core, columnar pellet cut to a specific length according to the present invention.

Through the extruder cross-head shown in FIG. 1, a continuous single-core filament made of a bundle of the above-mentioned electroconductive fibers, coated with the thermoplastic resin or filler-containing thermoplastic resin, is extruded and cut to a length of 6 to 10 mm for the iron-based metal fibers or 3 to 9 mm of the other fibers to form a single-core pellet, whose perspective view is shown in FIG. 2.

In FIGS. 1 and 2, numeral 1 is an inlet for a bundle of electroconductive fibers, 2 a die, 3 a guide ring, 4 molten thermoplastic resin, 5 a bundle of electroconductive fibers and 6 solidified thermoplastic resin.

Figure 3:
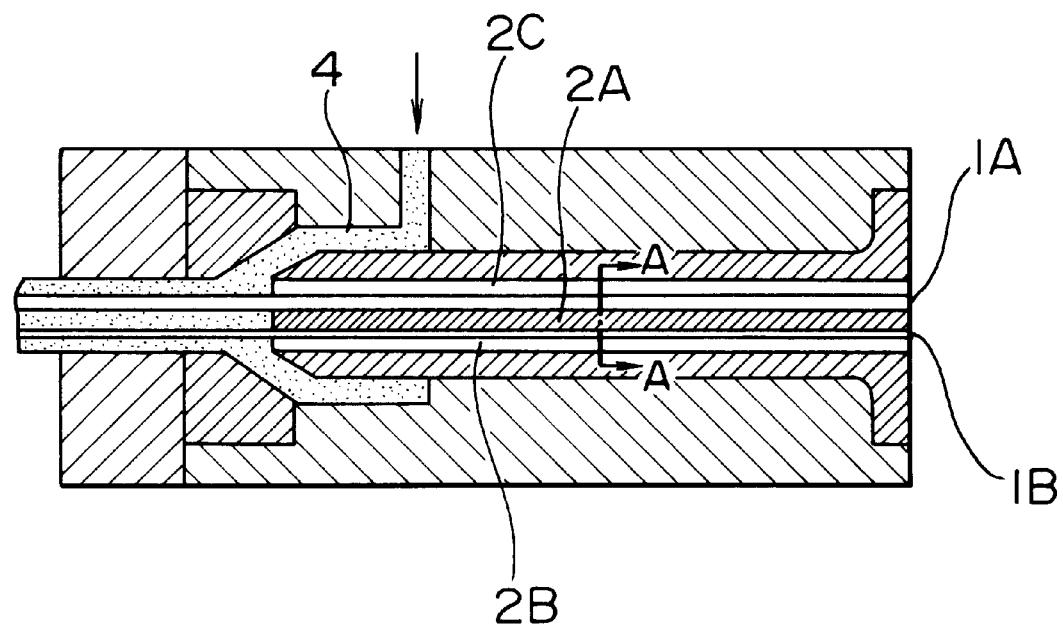
FIG. 3 is a cross-sectional view of another cross-head for extruding a multi-core filament for preparing pellets according to the present invention.
Figure 4:
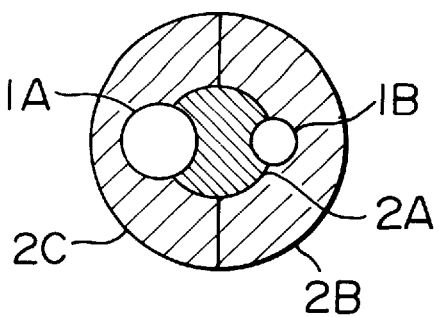
FIGS. 4 to 7 are cross-sectional views of different hole arrangements across the line A—A of FIG. 3.
Figure 5:
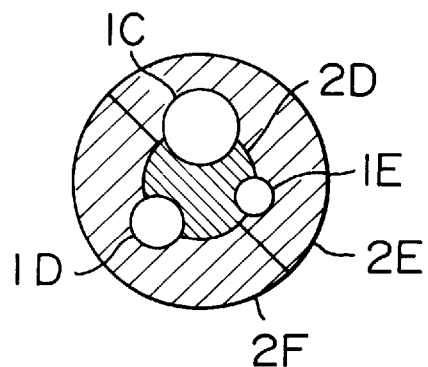
Figure 6:
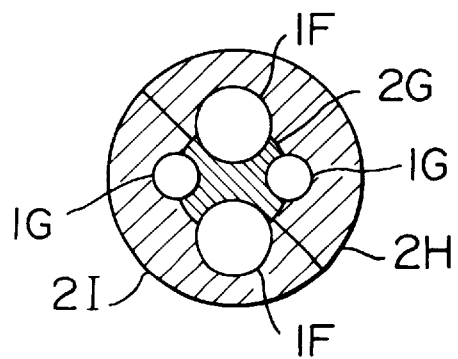
Figure 7:
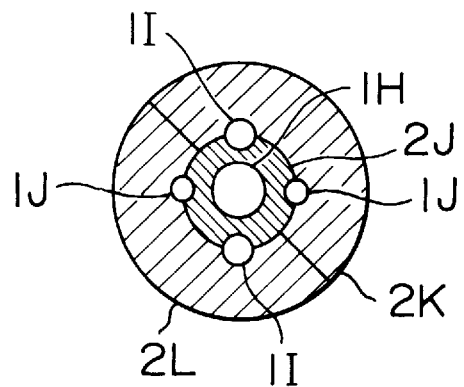
Figure 8A:
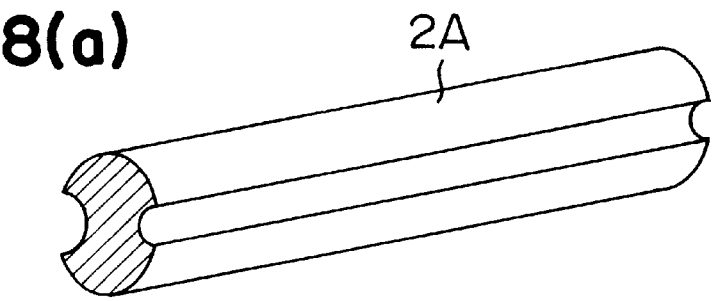
FIGS. 8 to 11 are perspective views of different die shapes corresponding to the hole arrangement of FIGS. 4 to 7, respectively, to be provided in the cross-head of FIG. 3.
Figure 8B:
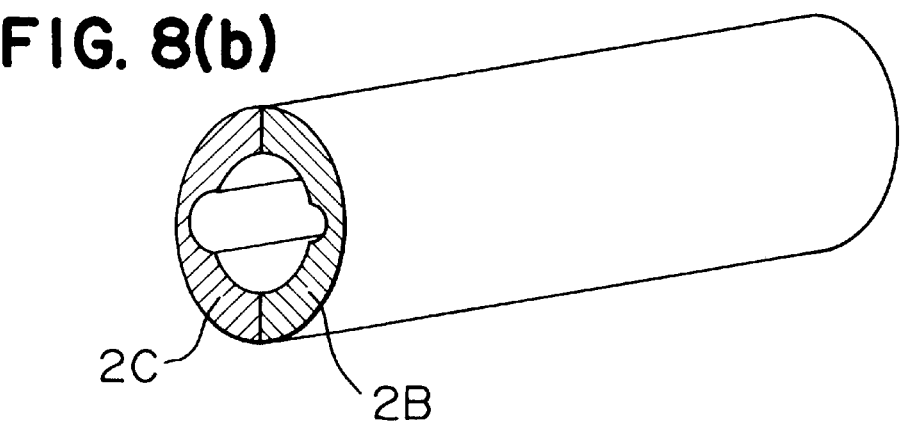
Figure 9A:
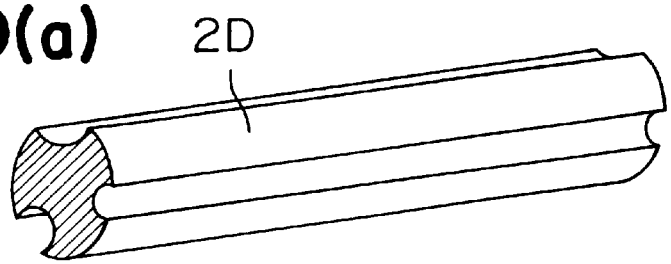
Figure 9B:
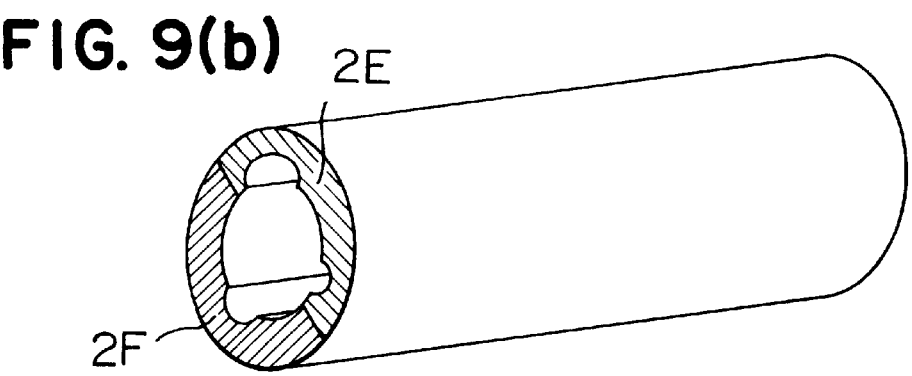
Figure 10A:
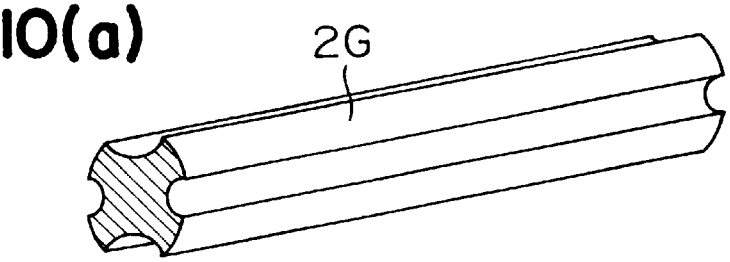
Figure 10B:
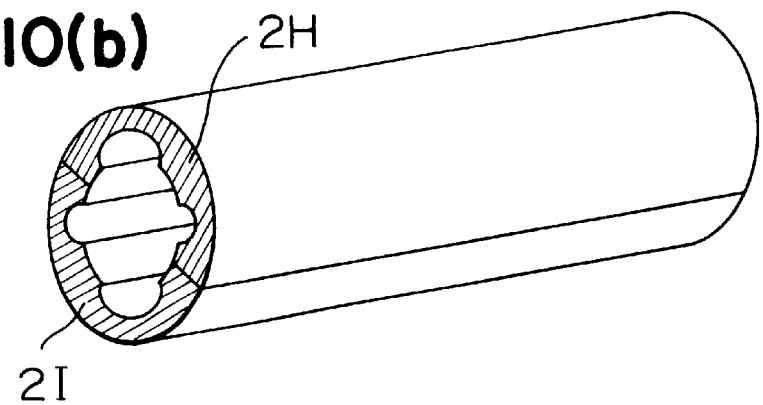
Figure 11A:
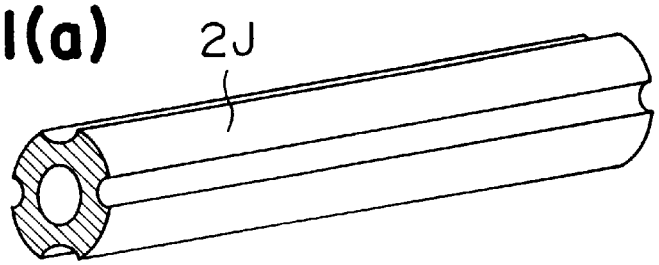
Figure 11B:
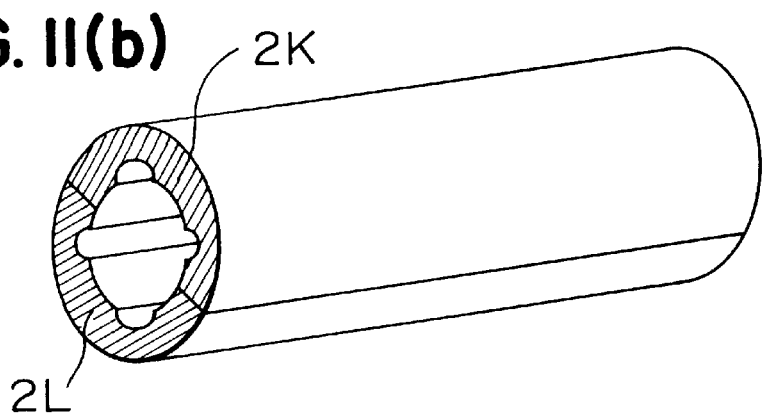
Figure 12:
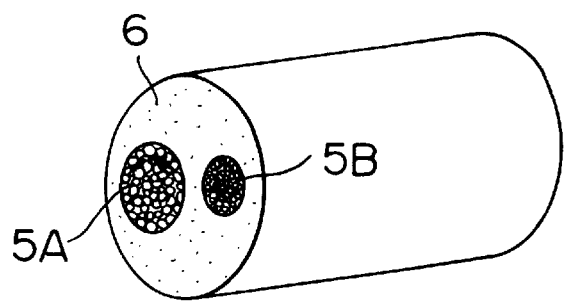
FIGS. 12 to 15 are perspective views of various corresponding columnar pellets of 2 cores up to 5 cores prepared through the holes of FIGS. 4 to 7 and the corresponding dies of FIGS. 8 to 11, each cut to a specific length.
Figure 13:
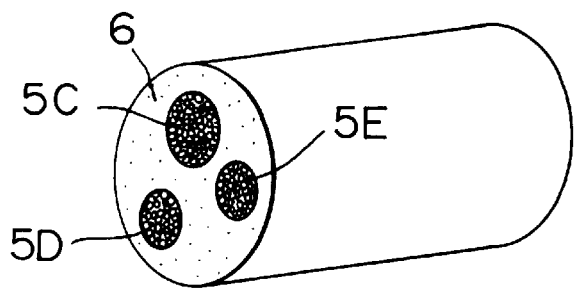
Figure 14:
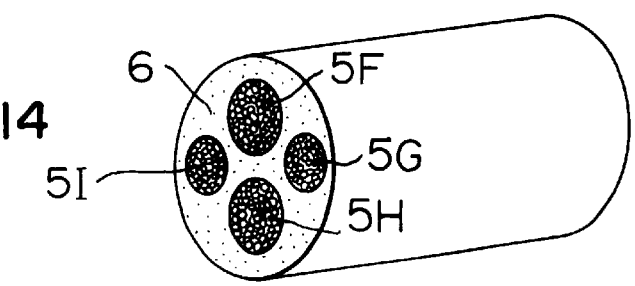
Figure 15:
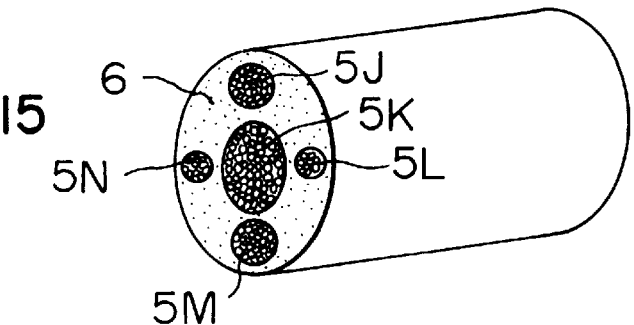

FIG. 3 shows the cross-head of another extruder for preparing a multi-core filament by extruding a plurality of bundles of electroconductive fibers including a bundle of iron-based metal fibers as the essential component together with the thermoplastic resin or filler-containing thermoplastic resin according to the present invention, where independent holes for passing 2 bundles up to 5 bundles of electroconductive fibers are provided as shown in FIGS. 4 to 7, respectively, showing the cross-sections of different hole arrangements along the line A—A of FIG. 3, and the difference in hole diameter is to meet a difference in the diameter of the bundle of electroconductive fibers and a combination ratio of the bundles, depending upon the materials of the electroconductive fibers. The shapes of such dies are shown in FIG. 8 for a die for two bundles to FIG. 11 for 5 bundles. The thus extruded, continuous multi-core filaments, each made of a plurality of bundles of electroconductive fibers including at least one bundle of iron-based metal fibers as an essential component, coated with the thermoplastic resin or filler-containing thermoplastic resin, is cut to a length of 3 to 10 mm in the pellet form, whose cross-sections are shown in FIG. 12 for a 2-core pellet to FIG. 15 for a 5-core pellet.

In FIG. 3, numeral 1A is an inlet for a bundle of non-ferrous electroconductive fibers, 1B an inlet for a bundle of iron-based metal fibers, 2A, 2B and 2C are dies, and 4 molten thermoplastic resin, and in FIGS. 4 to 11, numerals 1A–1J are inlets each for bundles of electroconductive fibers, and 2A–2L dies. In FIGS. 12 to 15, numerals 5A–5N are different bundles of electroconductive fibers and 6 solidified thermoplastic resin.

The mixing ratio of electroconductive fibers to the thermoplastic resin depends upon the level of unwanted electromagnetic wave interference shield effect, but must satisfy the regulations set forth by the U.S. Federal Communications Commission (FCC) in the U.S.A. or Voluntary Control council (VCCI) in Japan, and an appropriate range of the mixing ratio of electroconductive fibers to the thermoplastic resin containing no filler is as follows:

1 to 10% by weight of iron-based metal fibers
20 to 30% by weight of copper-based metal fibers
2 to 15% by weight of aluminum-based metal fibers
5 to 15% by weight of metal-coated fibers The present electroconductive resin composition for molding must contain iron-based metal fibers as an essential component. A satisfactory shield effect can be obtained only with the iron-based metal fibers, but the electroconductivity of the molding obtained therefrom is lower than that of the molding obtained from the other electroconductive fibers, and its economy is not so better than that of the other electroconductive fibers, though its thermal shock cycle characteristics are considerably better.

The present invention is based on an optimum combination of the iron-based metal fibers with the other electroconductive fibers to take the advantage of the iron-based metal fibers, and combinations of the iron-based metal fibers with the other electroconductive fibers are selected to meet the level required for the final molded product, and the mixing ratio of the total electroconductive fibers including the iron-based metal fibers to the thermoplastic resin containing no filler is preferably in a range of 7 to 40% by weight.

An electromagnetic wave interference shield structure, such as a housing for electronic equipment can be readily molded from pellets having a specific length according to the present invention with an ordinary injection molding, transfer molding, vacuum-pressure forming molding or sheet extrusion molding, because the electroconductive fibers take only as high as about 7% by volume in the pellets. The possibility for breakage of the electroconductive fibers during injection molding of a housing from the conventional resin composition is not so high as the possibility for the breakage during kneading of the electroconductive fibers with the thermopolastic resin for preparing the conventional pellets, but the present invention has overcome the breakage during kneading for preparing the pellets by making single core columnar pellets or multi-core columnar pellets having a specific length and also has reduced the possibility for the breakage of the electroconductive fibers during injection molding of a housing to substantially zero.

Electromagnetic wave interference shield structures molded from the present electroconductive resin composition for molding by injection molding, transfer molding or vacuum-pressure forming molding include housings for electronic equipment and electronic part containers for preventing electrostatic charging, and those molded by sheet extrusion molding include walls for electromagnetic wave shield and protective plates for electronic black boards and display boards.

PREFERRED EMBODIMENTS OF THE INVENTION

Pellet materials and procedures for preparing pellets and evaluating the characteristics of test pieces and molded housing used in Examples and Comparative Examples are given below:

Electroconductive Fibers

Iron-based metal fibers: stainless steel fibers, 8 μm in diameter, as will be hereinafter abbreviated to "SUS".

Copper-based metal fibers: copper fibers, 50 μm in diameter, as will be hereinafter abbreviated to "Cu".

Metal-coated fibers: Nickel-plated carbon fibers, 12 μm is diameter, as will be hereinafter abbreviated to "Ni-carbon". Nickel-copper-plated acrylic fibers, 15 μm in diameter, as will be hereinafter abbreviated to "Ni-acryl".

Thermoplastic Resin

Polycarbonate resin (heat distortion temperature: 130° C.), as will be hereinafter abbreviated to "PC".

Polyphenyleneether resin (heat distortion temperature: 120° C.), as will be hereinafter abbreviated to "PPE".

Polyphenyleneether resin (heat distortion temperature: 70° C.)

Filler

Quartz powder (average particle size: 25 μm)

Al flakes (1 mm×1 mm×30 μm)

In order to prepare single-core columnar pellets from a bundle of the above-mentioned electroconductive fibers and the above-mentioned thermoplastic resin, the bundle of the electroconductive fibers and the thermoplastic resin or filler-containing thermoplastic resin were continuously charged into a biaxial extruder provided with the cross-head of FIG. 1 (screw diameter: 32 mm; three-grooved thread; L/D=28) to extrude a single-core, continuous filament of the electroconductive fiber bundle coated with the molten thermoplastic resin or filler-containing thermoplastic resin, and the filament was passed through a cooling step and cut to a length of 7 mm.

In order to prepare multi-core columnar pellets from a plurality of bundles of the afore-mentioned electroconductive fibers and the afore-mentioned thermoplastic resin or filler-containing thermoplastic resin, 2 to 5 bundles of the electroconductive fibers and the thermoplastic resin or filler-containing thermoplastic resin were continuously changed to a biaxial extruder provided with the cross-head of FIG. 3, using the corresponding dies of FIGS. 8 to 11 (screw diameter: 32 mm; three-grooved thread; L/D=28) to form a multi-core, continuous filament of the electroconductive fiber bundles, coated with the molten thermoplastic resin or filler-containing thermoplastic resin, and the filament was passed through a cooling step and cut to a length of 7 mm.

Figure 16:
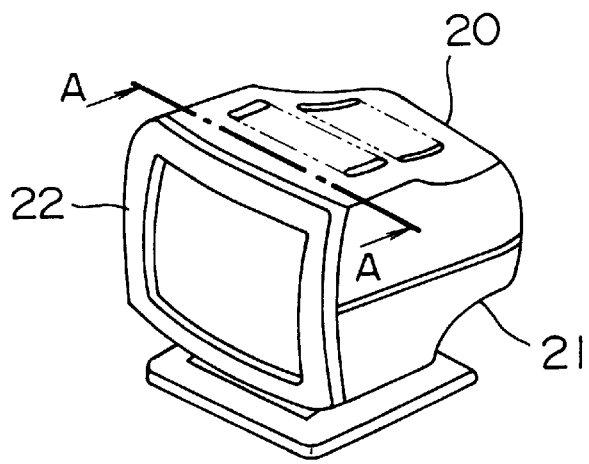
FIG. 16 is a housing for electronic equipment, molded from the present resin composition.
Figure 17:
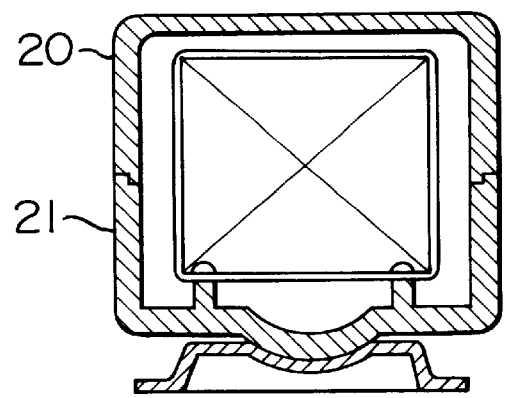
FIG. 17 is a cross-sectional view along the line A—A of FIG. 16.
Figure 18:
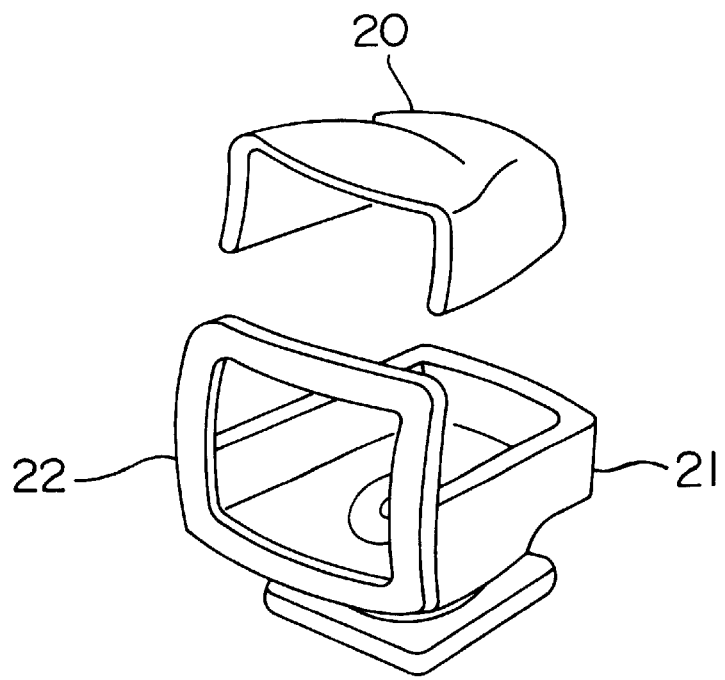
FIG. 18 is a disassembled perspective view of the housing of FIG. 16.

The thus prepared single-core, columnar pellets or multi-core, columnar pellets were molded into test pieces (200 mm×200 mm×3 mm) and housings for electronic equipments as shown in FIGS. 16 to 18 under the molding conditions of the thermoplastic resin. In FIGS. 16 to 18, numeral 20 is a top case, 21 a bottom case, and 22 a front frame.

In order to evaluate the durability of the thus prepared test pieces and housings for electronic equipment, a thermal shock cycle test of placing the test pieces and the housings in a thermostat tank at −20° C. for 2 hours and then placing them immediately in another thermostat tank at 70° C. for 2 hours as one cycle and repeating 30 cycles was carried out.

In order to evaluate the electromagnetic wave interference shield effect of the thus prepared housings for electronic equipment, the radiation electric field intensity of the unwanted electromagnetic wave generated from an electronic equipment under most stringent operating conditions was measured according to the voluntary control regulations for interference by data processing equipment and electronic office machines enforced on Mar. 27, 1986, in Japan, by VCCI.

EXAMPLES 1 TO 8 AND COMPARATIVE EXAMPLES 1 TO 3

Test pieces and housings for electronic equipment molded from the electroconductive resin compositions for molding, comprising at least two single-core, columnar pellets, each made of electroconductive fibers, coated with filler-containing thermoplastic resins according to the present invention (Examples 1 to 4) and test pieces and housings for electronic equipment molded from the electroconductive resin compositions for molding, comprising multi-core, columnar pellets, each made of electroconductive fibers, coated with thermoplastic resins containing no fillers according to the present invention (Examples 5 to 8) were subjected to measurements of volume resistivity and radiation electric field intensity and the results are shown in Table 1.

Furthermore, test pieces and housing for electronic equipment molded from one of conventional single-core columnar pellets containing no fillers (Comparative Examples 1 to 3) were subjected to measurements of volume resistivity and radiation electric field intensity, and the results are shown in Table 2.

TABLE 1

| Example No. | Composition Fibers | Mixing ratio (wt. %) | Test piece volume resistivity (Ω·cm) | Molding radiation electric field intensity (αB·μV/m) |
|---|---|---|---|---|
| 1 | SUS | 3 | $10^{-2} - 10^{-1}$ | 38 |
|   | Cu | 25 | | |
|   | PPE*1 | 72 | | |
| 2 | SUS | 5 | $10^{-2} - 10^{-1}$ | 35 |
|   | Ni-carbon | 10 | | |
|   | PC*2 | 85 | | |
| 3 | SUS | 3 | $10^{-2} - 10^{-1}$ | 32 |
|   | Ni-carbon | 12 | | |
|   | Ni-acryl | 10 | | |
|   | PC*2 | 75 | | |
| 4 | SUS | 3 | $10^{-2}$ | 36 |
|   | Cu | 15 | | |
|   | Ni-carbon | 5 | | |
|   | Ni-acryl | 5 | | |
|   | PPE*1 | 72 | | |
| 5 | SUS | 2 | $10^{-2}$ | 35 |
|   | Cu | 23 | | |
|   | PPE | 75 | | |
| 6 | SUS | 5 | $10^{-2} - 10^{-1}$ | 40 |
|   | Ni-carbon | 10 | | |
|   | PC | 85 | | |
| 7 | SUS | 2 | $10^{-2} - 10^{-1}$ | 40 |
|   | Ni-carbon | 10 | | |
|   | Ni-acryl | 10 | | |
|   | PC | 78 | | |
| 8 | SUS | 2 | $10^{-2}$ | 35 |
|   | Cu | 15 | | |
|   | Ni-carbon | 5 | | |
|   | Ni-acryl | 5 | | |
|   | PPE | 73 | | |

Remarks:
*1means that the resin contains 20% by weight of quartz powder as a filler.
*2means that the resin contains 10% by weight of Al flakes as a filler.

TABLE 2

| Comparative Example No. | Composition Fiber | Mixing ratio (wt. %) | Test piece volume resistivity (Ω·cm) | Molding radiation electric field intensity (αB·μV/m) |
|---|---|---|---|---|
| 1 | Cu | 15 | $10^1 - 10^2$ | 55 |
|   | PPE | 85 | | |
| 2 | Cu | 40 | $10^{-2}$ | 35 |
|   | PPE | 60 | | |
| 3 | SUS | 15 | $10^0 - 10^1$ | 52 |
|   | PPE | 85 | | |

A comparison of the results of Comparative Example 2 with those of Examples 1 and 5 reveals that equivalent effects to those of the prior art can be obtained in a smaller mixing ratio of electroconductive fibers in the present invention, irrespective of the presence of the filler.

Figure 19:
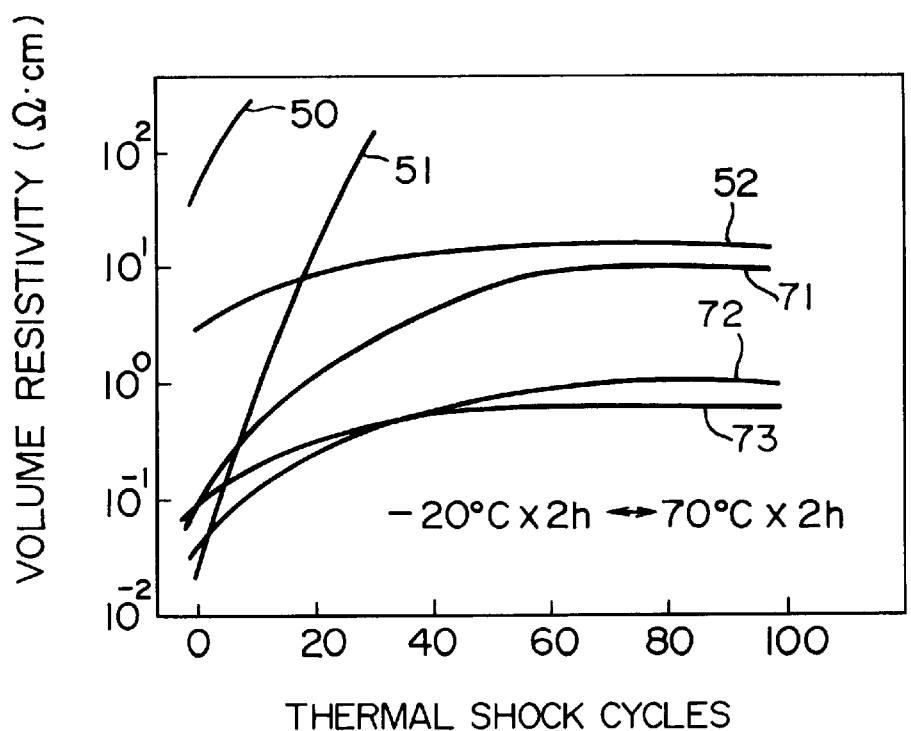
FIG. 19 is a diagram showing relationships between the volume resistivity and thermal shock cycles of test pieces prepared according to the present invention and Comparative Examples.

The results of thermal shock cycle tests of the test pieces under the afore-mentioned test conditions are shown in FIG. 19, where the curve 50 is directed to the test piece of Comparative Example 1, 51 to the test piece of Comparative Example 2, 52 to the test piece of Comparative Example 3, 71 to the test piece molded from the same resin composition as in Example 5, except that the thermoplastic resin having a heat distortion temperature of 70° C. is used in place of the thermoplastic resin having a heat distortion temperature of 120° C., 72 to the test piece of Example 5, and 73 to the test piece of Example 1.

As shown in FIG. 19, the test pieces of Comparative Examples 1 and 2 are not on a practical level, because the volume resistivity is considerably increased at the initial period of the thermal shock cycle test.

On the other hand, the volume resistivity of the test pieces of Examples 1 and 5 according to the present invention changes to a very small degree with increasing thermal shock cycles, and the change in the volume resistivity of the test piece containing the filler (Example 1, curve 73) can be improved with increasing thermal shock cycles, as compared with that of the test piece containing no filler (Example 5, curve 72). Anyway, the volume resistivity of Examples 1 and 5 is on a distinguished level with increasing thermal shock cycles, as compared with those of Comparative Examples 1 and 2.

Test piece of Comparative Example 3 was made from the single-core pellets of stainless steel fiber bundle, and had a smaller change in the volume resistivity than the test pieces of Comparative Examples 1 and 2, made from the single-core pellets of copper fibers, and thus had a better electroconductivity, but the volume resistivity was much higher than those of the test pieces of Examples 1 and 5.

When polyphenyleneether resin having the heat distortion temperature of 70° C. was used as the thermoplastic resin, the test piece containing such a resin had a higher volume resistivity than that of the test piece of Example 5. Thus, it is obvious that a thermoplastic resin for coating the electroconductive fibers must have a smaller thermal stress relaxation, that is, a higher heat distortion temperature.

The moldings obtained from the single-core pellets of stainless steel fiber bundle of Comparative Example 3 has a smaller change in the volume resistivity in the thermal shock cycle test, but requires many more steps in the drawing of very fine fibers and thus is very expensive and poor in the volume resistivity at the initial stage of thermal shock cycle test as compared with the moldings obtained from the single-core pellets of copper fiber bundle according to Comparative Examples 1 and 2. That is, it is a problem to use the single-core pellets of stainless steel fiber bundle alone with respect to the electromagnetic wave interference shield effect and economy. That is, it is obvious from the foregoing facts that a molding prepared from an electroconductive resin composition comprising pellets made of a copper fiber bundle taking the advantage of distinguished volume resistivity (that is, the electroconductivity) at the initial period of the thermal shock cycle test and a stainless steel fiber bundle taking the advantage of smaller change in the volume resistivity with increasing thermal shock cycles is quite distinguished.

The iron-based metal fibers have an effect on an increase in the contact points, because of the smaller fiber diameter. In place of the iron-based metal fibers, nickel-plated carbon fibers can be utilized, but have some problems in the number of manufacturing steps, the volume resistivity and cost and are not as good as the iron-based metal fibers. In place of the copper-based fibers, aluminum-based metal fibers, nickel-copper-plate polymer fibers, and nickel-copper-plated glass fibers can be also used. In summary, it is most effective to use combinations of a bundle of iron-based metal fibers as an essential component with at least one bundle of other metal fibers or metal-plated fibers.

Figure 20:
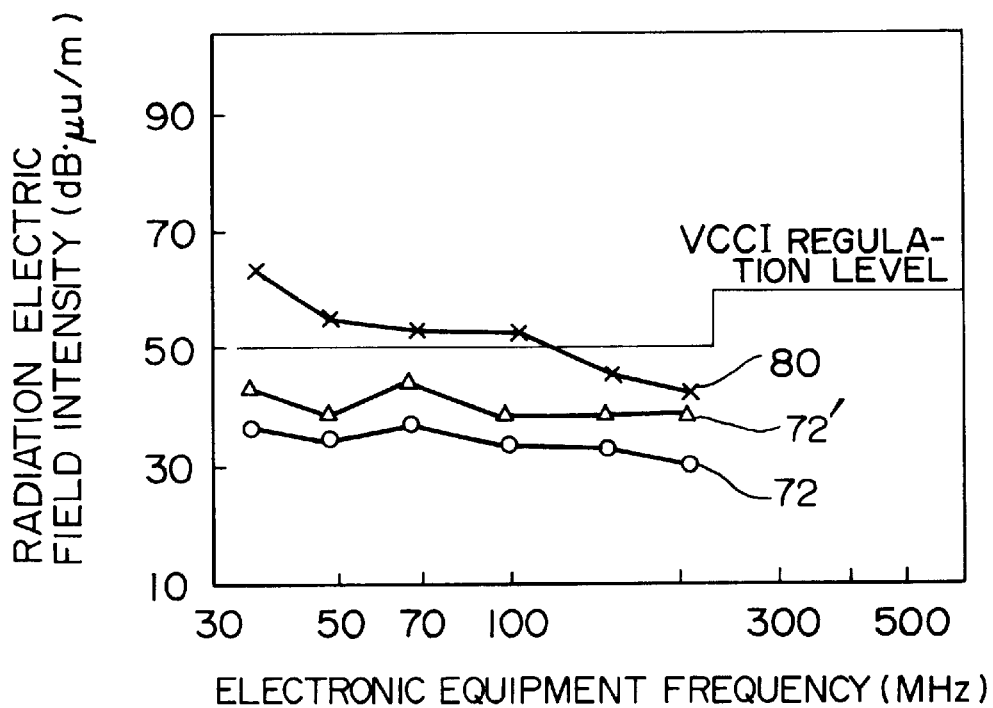
FIG. 20 is a diagram showing relationships between the radiation electric field strength and frequency of electronic equipment according to the present invention and Comparative Examples.

In FIG. 20, the results of measurement of radiation electric field intensity of electromagnetic waves leaked from the molded housing of Example 5 without the thermal shock cycle test according to the VCCI procedure are shown as curve 72, and those likewise obtained from the housing of Example 5 after the heat shock cycle test of 30 cycles are shown as curve 72'. It has been seen from FIG. 20 that these two are below the VCCI control level. Curve 80 in FIG. 20 shows the test results of a housing molded from a polyphenyleneether resin having the heat distortion temperature of 120° C. alone, that is, without any electroconductive fibers at all.

According to the present invention, a thermoplastic resin composition for molding, which comprises single-core, columnar pellets having a specific length or multi-core, columnar pellets can be obtained without any breakage of fibers, and an electromagnetic wave interference shield structure with increased contact points of the fibers, that is, higher electroconductivity due to use of the very fine iron-based metal fibers as an essential component in a smaller mixing ratio, a decreased specific gravity and an increased shield effect can be molded from these resin compositions with a good moldability. By further addition of a filler to the thermoplastic resin, high dimensional stability and heat radiation of the moldings can be obtained. That is, the operating stability of electronic equipment housed in the molding can be improved. By use of the thermoplastic resin of high distortion temperature, the molding can have an improved resistance to the thermal shock cycles.

What is claimed is:

1. An electroconductive resin composition for molding, which comprises columnar multi-core pellets, each made of a bundle of iron-based metal fibers as an essential component and at least one bundle of at least another kind of electroconductive fibers of different material in a different diameter than that of the iron-based metal fibers as independent electroconductive fiber cores, coated together with a thermoplastic resin having a specific range of heat distortion temperature continuously in the longitudinal direction.

2. An electroconductive resin composition for molding, according to claim 1, wherein the iron-based metal fibers have an aspect ratio of 400 to 2,000 and a diameter of 5 to 15 $\mu$m, and the electroconductive fibers of different material in a different diameter are at least one of copper-based metal fibers, aluminum-based metal fibers and metal-coated fibers having an aspect ratio of 50 to 600 and a diameter of 15 to 60 $\mu$m.

3. An electroconductive resin composition for molding according to claim 2, wherein a mixing ratio of the iron-based metal fibers to the thermoplastic resin is 1 to 10% by weight, a mixing ratio of the copper-based metal fibers to the thermoplastic resin is 20 to 30% by weight, a mixing ratio of the aluminum-based metal fibers to the thermoplastic resin is 2 to 15% by weight, and a mixing ratio of the metal-coated fibers to the thermoplastic resin is 5 to 15% by weight.

4. An electroconductive resin composition for molding according to claim 2, wherein the iron-based metal fibers are stainless steel fibers, the copper-based metal fibers are at least one of brass and nickel silver fibers, the aluminum-based metal fibers are aluminum fibers, and the metal-coated fibers are at least one of nickel-plated carbon fibers, copper-nickel-plated glass fibers and copper-nickel-plates polymer fibers.

5. An electroconductive resin composition for molding according to claim 1, wherein the heat distortion temperature of the thermoplastic resin is 80° C. to 210° C.

6. An electroconductive resin composition for molding according to claim 5, wherein the heat distortion temperature of the thermoplastic resin is 100° to 150° C.

7. An electroconductive resin composition for molding according to claim 5, wherein the heat distortion temperature of the thermoplastic resin is 110° to 130° C.

8. An electroconductive resin composition for molding according to claim 1, wherein the thermoplastic resin is one of ABS resin, high impact polystyrene, polycarbonate, polyphenyleneether, polyethersulfone, polybutylene terephthalate, nylon, polypropylene, ABS resin/polycarbonate polymer alloy, high impact polystyrene/polycarbonate polymer alloy, polyphenyleneether/polycarbonate polymer alloy, and polybutyene terephthalate/polycarbonate polymer alloy.

9. An electroconductive resin composition for molding according to claim 1, wherein the thermoplastic resin contains 5 to 10% by weight of a filler on the basis of the thermoplastic resin.

10. An electroconductive resin composition for molding according to claim 9, wherein the filler is at least one of quartz powder having an average particle size of 20 to 30 $\mu$m and plated mica flakes having a square of 1 to 2 mm ×1 to 2 mm.

11. An electroconductive resin composition for molding according to claim 1, wherein the thermoplastic resin contains 0.5 to 5% by weight in total of a pigment, a flame retarder, an internal release agent, and an antioxidant.

12. An electroconductive resin composition for molding according to claim 1, where the columner pellets have a length of 3 to 10 mm.

13. An electromagnetic wave interference shield structure, molded from an electroconductive resin composition for molding, which comprises columnar multi-core pellets, each made of a bundle of iron-based metal fibers as an essential component and at least one bundle of at least another kind of electroconductive fibers of different material in a different diameter than that of the iron-based metal fibers as independent electroconductive fiber cores, coated together with a thermoplastic resin having a specific range of heat distortion temperature continuously in the longitudinal direction.

14. An electromagnetic wave interference shield structure according to claim 13, wherein the electromagnetic wave shield structure is a housing for electronic equipment, or an electronic part container for preventing electrostatic charging, molded by injection molding, transfer molding, or vacuum-pressure-forming molding.

15. An electromagnetic wave interference shield structure according to claim 13, wherein the electromagnetic wave shield structure is a wall for electromagnetic wave shield or a protective plate for an electronic black board or display board, molded by sheet extrusion molding.

16. An electromagnetic wave interference shield structure according to claim 13, wherein the heat distortion temperature of the thermoplastic resin is 110° to 130° C.

* * * * *